(12) United States Patent
Lam

(10) Patent No.: US 9,671,978 B2
(45) Date of Patent: Jun. 6, 2017

(54) SYSTEM AND METHOD FOR STORING DATA AND ACCESSING STORED DATA

(71) Applicant: FalconStor, Inc., Melville, NY (US)

(72) Inventor: Wai Lam, Jericho, NY (US)

(73) Assignee: FalconStor, Inc., Melville, NY (US)

( * ) Notice: Subject to any disclaimer, the term of this patent is extended or adjusted under 35 U.S.C. 154(b) by 0 days.

(21) Appl. No.: 13/872,744

(22) Filed: Apr. 29, 2013

(65) Prior Publication Data

US 2013/0238850 A1 Sep. 12, 2013

Related U.S. Application Data

(63) Continuation of application No. 11/893,827, filed on Aug. 16, 2007, now Pat. No. 8,433,732.

(60) Provisional application No. 60/838,918, filed on Aug. 18, 2006.

(51) Int. Cl.
G06F 3/06 (2006.01)
G06F 11/14 (2006.01)

(52) U.S. Cl.
CPC .......... G06F 3/065 (2013.01); G06F 11/1448 (2013.01); G06F 11/1456 (2013.01); G06F 11/1461 (2013.01); G06F 11/1469 (2013.01)

(58) Field of Classification Search
None
See application file for complete search history.

(56) References Cited

U.S. PATENT DOCUMENTS 3,618,027 A * 11/1971 Feng ............................ 707/741
5,608,865 A * 3/1997 Midgely ............. G06F 11/2028
707/999.2
5,778,384 A * 7/1998 Provino ............ G06F 17/30233
6,356,915 B1 * 3/2002 Chtchetkine ...... G06F 17/30235
707/823
6,618,736 B1 * 9/2003 Menage
7,058,788 B2 6/2006 Niles et al.
(Continued)

OTHER PUBLICATIONS

In Unix, what is a symbolic link and how do I create one? May 13, 2009 [Accessed on Sep. 11, 2013], Indiana University, http://kb.iu.edu/data/abbe.html.*

(Continued)

*Primary Examiner* — Jason Liao
(74) *Attorney, Agent, or Firm* — Cozen O'Connor; Brandon N. Sklar

(57) ABSTRACT

In one example of a method to access data, selected data stored in a virtual tape library ("VTL") maintained in a selected format in a first non-tape storage medium is examined. One or more first directories and one more first files are identified within the selected data. One or more second directories, and one or more second files, comprising information identifying at least one of the one or more first files, are generated and are stored in a second non-tape storage medium. A request specifying at least one of the one or more second files is received from a device, and information identifying at least one of the one or more first files is retrieved from the specified second file. The at least one first file is accessed based at least in part on the information, and data from the at least one first file is provided to the device. Systems are also disclosed. Methods and systems to enable users without system administrator rights to access and store data in a backup storage system are also disclosed.

35 Claims, 11 Drawing Sheets

(56) References Cited

U.S. PATENT DOCUMENTS

| | | | |
|---|---|---|---|
| 7,069,401 | B1 | 6/2006 | Noonan et al. |
| 7,127,479 | B2* | 10/2006 | Tsaur et al. |
| 7,266,655 | B1* | 9/2007 | Escabi et al. ............... 711/162 |
| 7,631,143 | B1 | 12/2009 | Niver et al. |
| 2007/0055840 | A1 | 3/2007 | Yamamoto et al. |
| 2007/0198659 | A1 | 8/2007 | Lam |

OTHER PUBLICATIONS

Williams et al., The Ultimate Windows Server 2003 System Administrator's Guide 2003, Pearson Education, pp. 272-310.*
Reparse Points [date unknown], Microsoft, http://msdn.microsoft.com/en-us/library/windows/desktop/aa365503%28v=vs.85%29.aspx.*
How NTFS Works Mar. 28, 2003, Microsoft, http://technet.microsoft.com/en-us/library/cc781134%28v=ws.10%29.aspx.*
Knuth, The Art of Computer Programming 1998, Additon-Wesley, 2nd ed. vol. 3, pp. 566-573.*
Lawrence, bind-mount date unknown but at least Apr. 30, 2006, aplawrence.com, http://aplawrence.com/Linux/mount_bind.html.*
Cow et al., Fun with mount—bind Dec. 13, 2004, fedoraforum.org, http://forums.fedoraforum.org/archive/index.php/t-29494.html.*
'On computable numbers, with an application to the Entscheidungsproblem' from Proceedings of the London Mathematical Society, (Ser. 2, vol. 42, 1937).
CDIA Training & Test Preparation Guide, 2000, Specialized Solutions, pp. 68-69.
The Authoritative Dictionary of IEEE Standards Terms 2000, IEEE, $7^{th}$ Ed, 318.
VERITAS NetBackup 5.1 Backup, Archive, and Restore Getting Started Guide for Unix and Windows; 2004.
VERITAS NetBackup 5.1 System Administrator's Guide, 2004, VERITAS Software Corporation, vol. 1.
VERITAS NetBackup 5.1 System Administrator's Guide 2004, VERITAS Software Corporation, vol. 2.
T_N et al., How to setup Virtual tape Library, Feb. 10, 2007, http://www.symantec.com/connect/forums/how-setup-virtual-tape-library.
Deturi, Why everyone should use virtual drives, Apr. 15, 2007, deturi.com, http://deturi.com/node/13.
VERITAS NetBackup 5.1 System Administrator's Guide, 2004, VERITAS Software Corporation, vol. 2.
T_N et al, How to setup Virtual tape Library, Feb. 10, 2007, http://www.symantec.com/connect/forums/how-setup-virtual-tape-library.

* cited by examiner

SYSTEM AND METHOD FOR STORING DATA AND ACCESSING STORED DATA

CROSS-REFERENCE TO RELATED APPLICATIONS

The present application is a continuation of U.S. patent application Ser. No. 11/893,827, which was filed on Aug. 16, 2007 and will issue on Apr. 30, 2013 bearing U.S. Pat. No. 8,433,732, which claims priority from U.S. Patent Application No. 60/838,918, which was filed on Aug. 18, 2006, both of which are assigned to the assignee of the present application and are incorporated by reference herein in their entireties.

FIELD OF THE INVENTION

The invention relates generally to a system and method for storing data, and more particularly, to methods and systems for backing up data and for enabling users to access data stored in a backup storage system.

BACKGROUND OF THE INVENTION

Tape libraries have long been used in backup storage systems to store data. A tape library typically comprises one or more tapes and a mechanism, such as a tape drive, for reading and writing data on the tape(s). In addition, a backup software application manages the storage of data in the tape library. The backup software handles read and write requests received from client computers in a network and directs the requests to the tape library, for example.

Today, large amounts of data are stored in tape libraries. However, due to the inherent limitations of tape libraries, reading or writing data on a tape is often cumbersome and restrictive. Tape is a sequential medium; consequently it requires more time to access a desired data file stored on a tape than to access a file stored on a random-access medium such as a disk drive. In addition, many tape libraries comprise mechanical parts used to load tapes, etc., and sometimes require human intervention to identify a desired tape or perform other tasks. Therefore, in many cases, performing a data processing operation on data stored on tape is slower than performing the corresponding operation on a random access medium such as a disk drive. As a result, virtual tape libraries ("VTLs"), which typically use one or more disk drives to store data, are sometimes installed in backup storage systems to replace mechanical tape libraries.

When a VTL is added to a tape library system, read and write requests received after the installation of the VTL are typically directed by the backup software to the VTL for storage. Accordingly, any new data is stored in the VTL. Data stored in the VTL is sometimes stored using the same format used by the original, mechanical tape library. Adopting the same format allows a VTL to replace a mechanical tape library and continue to work with the existing backup software seamlessly, thereby avoiding costly changes to an enterprise's IT infrastructure.

When a backup system is updated to include a VTL, handling the existing data stored in the original tape library can pose a challenge. The format of data stored on tape(s) within a given tape library varies depending on the vendor of the tape library. In most cases, the format used in the original tape library does not match the format of the VTL that is added to the backup storage system. Known backup software applications cannot copy data stored in a tape library in a first format and store the data in a VTL in a second format.

Accordingly, in one common arrangement, the original tape drive is preserved in the backup storage system so that stored data may continue to be accessed, and a VTL is added and used for storing data in subsequent backup operations. The addition of a VTL can significantly improve the access speed of a backup storage system.

A separate challenge is posed by the large and growing amount of data stored in many existing VTLs. Because many backup storage systems store multiple copies of data files within a VTL to ensure redundancy, the organization of directory structures associated with the stored data can rapidly become cumbersome and inefficient. In such systems, the large amount and inefficient organization of the stored data can add to the time required to access a desired data file. Also subsequent backup operations may generate duplicate or redundant copies of data that has already been stored within the VTL, further exacerbating the problems associated with long term data storage.

Known backup systems are also not user-friendly. This sometimes becomes frustratingly evident to an ordinary user of an organization's computer network when a data file on the user's computer is lost or corrupted. In such cases, it may be necessary to restore the file from the backup storage system. To restore a data file, it is often necessary to direct a specified server, such as a media server, in the network to search for the location of the file in the backup system and to restore it. This procedure is usually beyond the capabilities of ordinary computer users, who are forced to seek out the assistance of the system administrator or to call the "Help Desk" in the organization's technical department. Sometimes multiple interactions between the user and the technical department are necessary. For example, after calling the Help Desk, a person from the technical department or the storage administrator may use the specified media server to search through the directories in the backup system, and find multiple versions of the requested file. The user may then be contacted and asked to specify which version is desired. This common procedure is inefficient at best, and can frequently be chaotic and frustrating for users.

In addition, in many organizations, only certain users of a computer network are granted "system administrator" rights (or similar authority), allowing such users authority to access all or a large part of the data stored anywhere within the network. Often, only a relatively small number of highly-trained individuals, such as those within the organization's information technology department are granted such rights. A user granted system administrator rights may access data stored in other user's computers, for example. Such users may also access archived data in a backup system, which may include tape drives, disk drives, or a combination of tape drives and disk drives. In such organizations, a large number of users do not have system administrator rights. Such users are typically allowed to store data and to access data already stored in their own computers, but are not allowed to access directly archived data stored in the backup storage system, or to store data directly in the backup storage system. These users must contact an individual with system administrator rights to access archived data or to store data in the backup storage system.

SUMMARY OF THE INVENTION

In accordance with an embodiment of the invention, systems and methods are provided to enable users to access stored data. The data may be stored in any storage system; in one example data is stored in a virtual tape library ("VTL"). To render the stored data more accessible to users, the data stored in the VTL is examined, and one or more directories and files stored in the VTL are identified. One or more shadow directories corresponding to the identified directories, and one or more shadow files corresponding to the identified files, are created and stored. In general, a shadow directory comprises a directory that corresponds to, and may have a structure similar to, a specified directory stored in a specified storage system/device. Similarly, a shadow file comprises a data structure, such as a file, that corresponds to a specified file on a specified storage system/device. The shadow file typically does not contain all of the data associated with the specified file, however.

An indicator, which may be a pointer, for example, is placed in each of the shadow files indicating the location of the data stored in the corresponding file. Subsequently, the shadow directories and shadow files may be presented to users or to client devices as an indication of the corresponding data stored in the VTL. When a data processing request pertaining to a data file stored in the VTL, such as a read request, is received, the corresponding shadow file is accessed. The pointer is examined, and the data at the indicated location is retrieved and provided in response to the request.

In accordance with another embodiment of the invention, a method to store data is provided. Selected data stored in a virtual tape library (VTL) maintained in a selected format in a first non-tape storage medium is examined. One or more first directories and one more first files are identified within the selected data. One or more second directories, and one or more second files, each comprising information identifying at least one of the one or more first files, are generated based at least in part on the one or more first directories and the one more first files, and are stored in a second non-tape storage medium. A request specifying at least one of the one or more second files is received from a device, and information identifying at least one of the one or more first files is retrieved from the specified second file. The at least one first file is accessed based at least in part on the information, and data from the at least one first file is provided to the device.

In one example, one or more third directories and one or more third files stored in the tape library are identified, and one or more fourth directories and one or more fourth files are stored in the VTL based on the one or more third directories and the one or more third files. The one or more fourth directories may comprise the one or more first directories, and the one or more fourth files may comprise the one more first files.

The first non-tape storage medium may comprise at least one disk drive. The first non-tape storage medium and the second non-tape storage medium may be the same. The information in the specified second file may comprise an indicator, which may include a pointer, identifying a memory location of the at least one of the one or more first files.

The VTL may comprise data copied from a tape library having the selected format. The method may further comprise copying the data from the tape library to the VTL.

In another embodiment of the invention, a system to store data is provided. The system comprises a virtual tape library (VTL) maintained in a first non-tape storage medium. The VTL is configured to store data in a selected format. The system also comprises a second non-tape storage medium configured to store data. The system further comprises a processor configured to examine selected data stored in the VTL, identify within the selected data one or more first directories and one more first files, and generate one or more second directories, and one or more second files, each comprising information identifying at least one of the one or more first files, based at least in part on the one or more first directories and the one more first files. The processor is also configured to store the one or more second directories and the one or more second files in the second non-tape storage medium, receive from a device a request specifying at least one of the one or more second files, and retrieve from the specified second file information identifying at least one of the one or more first files. The processor is further configured to access the at least one first file, based at least in part on the information, and provide data from the at least one first file to the device.

In another embodiment of the invention, a method to enable a user of a device to access data stored in a backup storage system is provided. Backup copies of at least one data file are generated based on one or more data files stored in respective local memories of a plurality of user devices, and the backup copies of the data files are stored in a centralized storage repository. A request to retrieve a backup copy of a specified data file is received from a respective one of the plurality of user devices operated by a user without system administrator rights. A backup copy of the specified data file from the central storage repository is retrieved in response to the request, and is provided to the respective device.

In one example, the plurality of user devices comprises at least one personal computer (PC). The at least one backup storage device may includes at least one tape library. The at least one backup storage device may includes at least one disk drive.

The method may further comprise presenting to a user of the user device a graphical user interface (GUI) indicating one or more backup copies of data files stored in the backup storage system, allowing the user to select at least one of the indicated backup copies for retrieval, and transmitting a request to retrieve the selected backup copy to the backup storage system. In one example, each of the plurality of user devices communicates with the backup storage system via a direct connection.

In another embodiment of the invention, a system to enable a user of a device to access data stored in a backup storage system is provided. The system comprises a plurality of user devices comprising respective local memories configured to store data files. The system also comprises a backup storage system comprising a centralized storage repository comprising at least one backup storage device configured to store backup copies of the data files stored in the respective local memories, and a processor. The processor is configured to receive, from a respective user device operated by a user without system administrator rights, a request to retrieve a backup copy of a specified data file, retrieve, in response to the request, a backup copy of the specified data file from the central storage repository, and provide the backup copy of the specified data file to the respective device.

BRIEF DESCRIPTION OF THE DRAWING

Further objects, features and advantages of the invention will become apparent from the following detailed description taken in conjunction with the accompanying figures showing illustrative embodiments of the invention, in which.

DETAILED DESCRIPTION

In accordance with an embodiment of the invention, systems and methods are provided to enable users to access data stored in a tape library. In one example, a backup storage system comprising a tape library is upgraded by the addition of a virtual tape library ("VTL"). The upgraded backup storage system may serve as a centralized backup storage repository for a distributed network of computers and other devices. After the addition of the VTL, subsequent data processing requests may be directed to the VTL; therefore, for example, subsequent requests to write data are directed to the VTL and the data is stored in the VTL. However, the original tape library remains in the backup storage system, and the data stored therein remains accessible to users.

In one embodiment, to render the data stored in the original tape library more accessible to users, the data stored in the tape library is examined, and one or more directories and files stored in the tape library are identified. One or more shadow directories corresponding to the identified directories, and one or more shadow files corresponding to the identified files, are created in the VTL. In general, a shadow directory comprises a directory that corresponds to, and may have a structure similar to, a specified directory stored in a specified storage system/device. Similarly, a shadow file comprises a data structure, such as a file, that corresponds to a specified file on a specified storage system/device. The shadow file typically does not contain all of the data associated with the specified file, however.

A pointer is placed in each of the shadow files indicating the location of the data stored in the corresponding file. Subsequently, the shadow directories and shadow files may be presented to users or to client devices as an indication of the data stored in the original tape library. When a data processing request pertaining to a data file stored in the original tape library, such as a read request, is received, the corresponding shadow file is accessed. The pointer is examined, and the data at the indicated location is retrieved and provided in response to the request.

Figure 1:
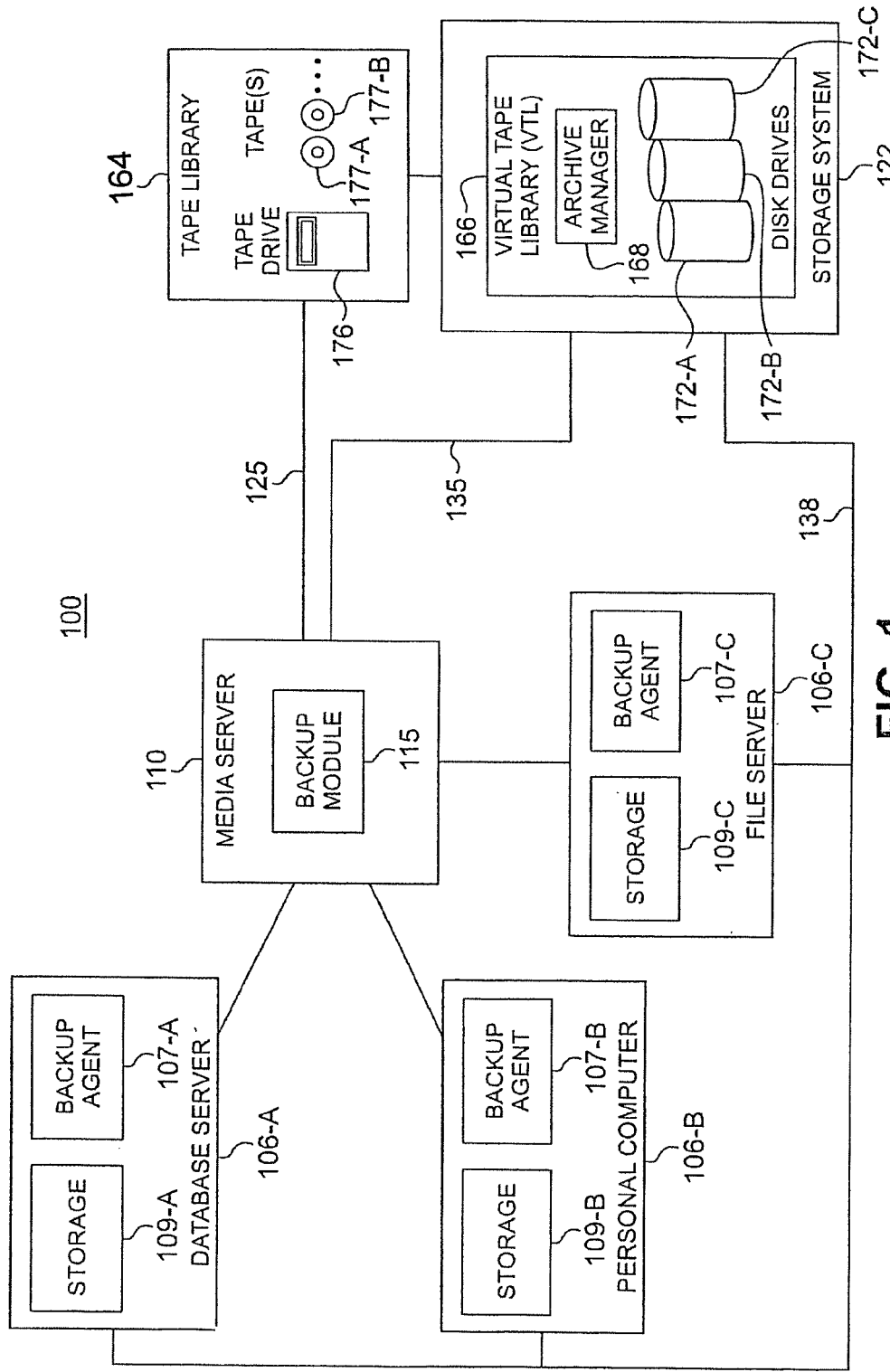
FIG. 1 is a block diagram of an example of a system that may be used to store data, in accordance with an embodiment of the invention.

FIG. 1 is a block diagram of an example of a system 100 that may be used to store data, in accordance with an embodiment of the invention. The system 100 comprises a tape library 164, a storage system 122, a media server 110 and one or more client computers 106. The tape library 164 is connected to the media server 110 via a path 125, which may comprise a SCSI connection, a Fibre Channel connection, a network, or any other suitable type of connection.

In this example, three clients 106-A, 106-B, and 106-C are illustrated. The client computer 106-A comprises a database server, the client computer 106-B comprises a personal computer, and the client computer 106-C comprises a file server. It should be noted that although three particular client computers are shown in this example, any number of client computers of any type may be connected to the media server 110.

Each client computer 106 comprises a local storage 109 and a respective backup agent 107. Thus, the client 106-A comprises the local storage 109-A and a backup agent 107-A, the client 106-B comprises the local storage 109-B and a backup agent 107-B, and the client 106-C comprises the local storage 109-C and a backup agent 107-C. Each client computer 106 is connected to the media server 110. Each client computer 106 is also connected directly to the storage system 122 via the path 138, which may comprise an Ethernet connection, for example.

For convenience, the discussion below will be limited to the client 106-A, the local storage 109-A and the backup agent 107-A; however, it should be noted that any references to the client 106-A (and/or to the local storage 109-A or the backup agent 107-A) apply equally to other client computers that may communicate with the media server 110 (and their associated storage and backup agents, as appropriate).

The local storage 109-A may comprise one or more disk drives, for example. The backup agent 107-A monitors data stored in the local storage 109-A of the client 106-A and from time to time causes selected data to be backed up. Accordingly, the backup agent 107-A may selectively retrieve data from the local storage 109-A and transmit the data to the media server 110 to be backed up. The backup agent 107-A may transmit selected data to the backup module 115 with a request to backup the data. The backup agent 107-A may comprise a software application, specialized circuitry, or a combination of software and circuitry.

The media server 110 comprises a computer, such as a server, a personal computer, etc. The media server 110 also comprises a backup module 115, which causes data to be backed up in the tape library 164. The backup module 115 facilitates the backup of data received from the backup agent 107-A. For example, the backup module 115 may from time to time receive from the backup agent 107-A a request to backup data, and in response cause the data to be backed up in the tape library 164. The backup module 115 may comprise a software application, specialized circuitry, or a combination of software and circuitry. Alternatively, the backup module 115 may comprise specialized software and/or circuitry configured to access the local storage 109-A directly. In such case, the backup agent 107-A may not be required.

The tape library 164 comprises one or more tape drives, of which one tape drive 176 is shown, and one or more tapes 177-A, 177-B, etc., which may be used to store data. The tape drive 176 is capable of storing data on, and retrieving stored data from, the tapes 177-A, 177-B, etc. The tape library 164 from time to time receives data from the media server 110 and stores the data on the tapes 177. The tape drive 176 may also retrieve data from the tapes 177 and transmit such data to the media server 110 upon request. The use of tape libraries to store data is well-known.

Figure 2:
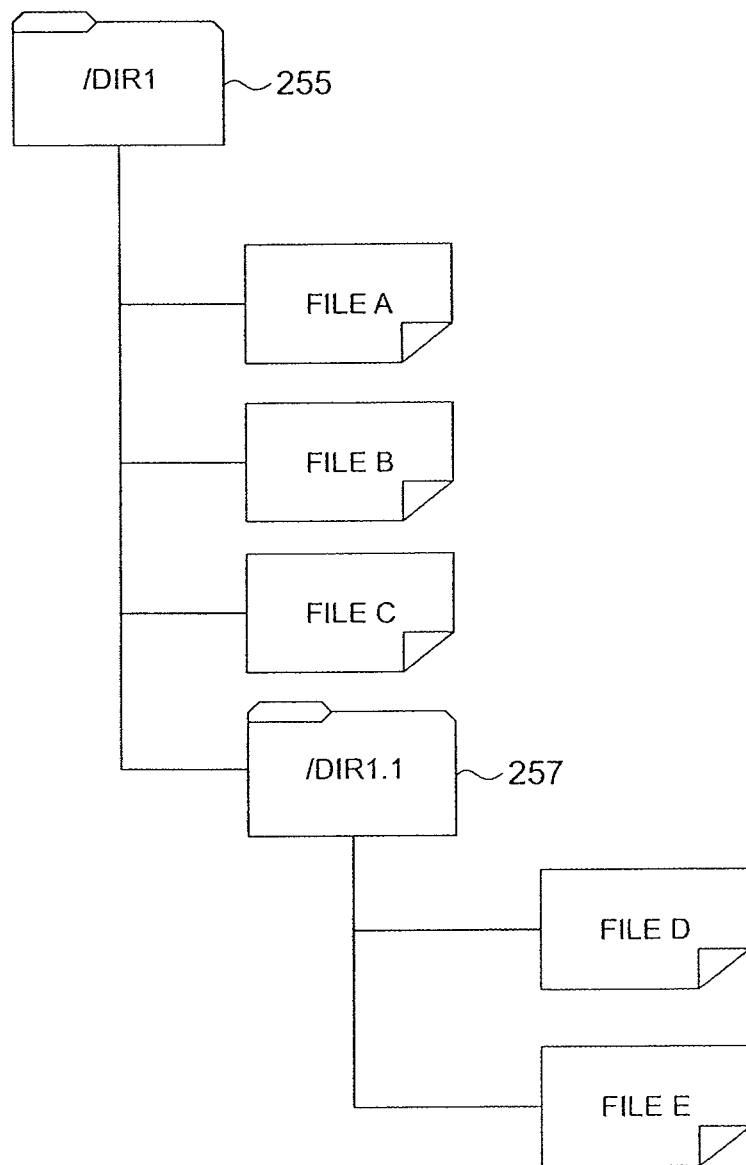
FIG. 2 shows an example of a directory that may be maintained in the system of FIG. 1, in accordance with an embodiment of the invention.

Data in the tape library 164 is stored on the tapes 177 in the form of data files, which are organized in one or more directories. The directories are also stored on the tapes 177. As an illustrative example, FIG. 2 shows a directory 255 that may be maintained in the tape library 164, in accordance with an embodiment of the invention. The directory 255, indicated by "/Dir1", comprises multiple data files, including files A, B, C, etc., and may also contain one or more subdirectories, such as subdirectory 257, which is indicated by "/Dir1.1". In this example, the subdirectory 257 contains File D and File E. It should be noted at this point that the various data files stored in a directory (such as Files A, B, C, etc.) may be stored collectively on a single storage device, such as on a single tape, or alternatively may be stored collectively on multiple storage devices. For example, File A may be stored on a first tape, File B may be stored on a second tape, etc.

Virtual Tape Library

System 100 also includes a storage system 122 comprising one or more storage devices capable of storing data, such as disk drives, optical disks, etc. The storage system 122 also comprises a virtual tape library (VTL) 166. The VTL 166 may comprise software residing in the storage system 122, or alternatively, hardware or a combination of software and hardware. In the example of FIG. 1, the storage system 122 comprises three disk drives 172-A, 172-B, and 172-C, which are used to implement the VTL 166. The storage system 122 is connected to the media server 110 via a path 135, which may be a SCSI connection, a Fibre Channel connection, a network, or any other suitable type of connection. It should be understood that while in the example of FIG. 1, three disk drives 172-A, 172-B, and 172-C are shown, the storage system 122 may comprise any number of disk drives or other storage devices. It should also be understood that while the disk drives 172 are used to implement the virtual tape library (VTL) 166, the storage system 122 may also comprise additional storage devices not associated with the VTL 166.

Virtual tape libraries are sometimes used in place of, or in addition to, a tape library to add additional capacity and capabilities to a data backup system. For example, in the embodiment of FIG. 1, after the VTL 166 is installed, data designated to be backed up is thereafter directed by the media server 110 to the VTL 166. Such data may be stored in the VTL 166 in a format that emulates the format used by the tape library 164. However, the tape library 164, and any data previously stored therein, remains accessible to the media server 110, so that such data may still be accessed when needed.

The VTL 166 also comprises an archive manager 168. The archive manager 168 manages the storage and retrieval of data in the VTL 166. The archive manager 168 may from time to time receive from the media server 110 a request to store data. In response, the archive manager 168 stores the data in an appropriate location or locations on the disk drives 172. The archive manager 168 may also from time to time receive from the media server 110 a request to retrieve one or more data files. In response to such a request, the archive manager 168 identifies the location of the requested data file, retrieves a copy of the data file and provides the data file to the media server 110. The archive manager 168 may comprise software, hardware, or a combination of software and hardware. In the example of FIG. 1, the archive manager 168 comprises a software application residing on the storage system 122.

In this example, the archive manager 168 has direct access to the tape library 164, and the capability to examine data stored in the tape library 164, identify the format of the stored data, and create in the VTL 166 one or more corresponding directories and one or more corresponding files in a selected format. Thus, in this embodiment, the archive manager 168 is capable of recognizing multiple formats used by currently available backup systems, including formats used by Veritas Netbackup, Tivoli Storage Manager, and other well-known backup software and systems. Veritas Netbackup is available from Symantec Corporation, located in Cupertino, Calif. Tivoli Storage Manager is available from IBM Corp., located in Armonk, N.Y. Also in this embodiment, the archive manager 168 is capable of storing data in the VTL 166 in any one of a number of formats currently used. Alternatively, the backup module 115 may have the capability to examine data stored in the tape library 164, identify the format of the stored data, and direct the archive manager 168 to create one or more corresponding directories and one or more corresponding files.

It should be noted that some or all of the functions of the backup module 115 described herein may be performed by one or more of the backup agents 107-A, 107-B, 107-C, etc., residing in the client computers 106-A, 106-B, 106-C, etc. For example, while certain communications are described herein as involving a first communication between the backup agent 107-A and the backup module 115 and a second communication between the backup module 115 and the VTL 166, the backup agent 107-A may transmit a corresponding communication directly to the VTL 166.

Figure 3:
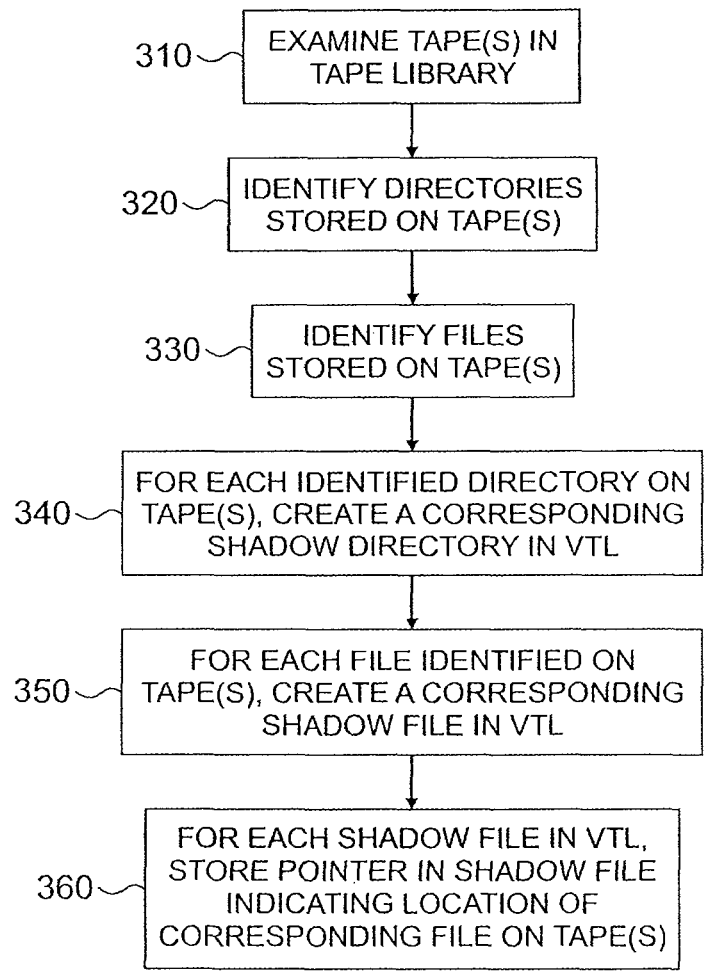
FIG. 3 is a flowchart depicting an example of a method for creating shadow directories and files in a VTL, in accordance with the embodiment of FIG. 1.

In accordance with an embodiment of the invention, one or more shadow directories and one or more shadow files are created in the VTL 166 to emulate selected directories and files stored in the tape library 164. FIG. 3 is a flowchart of an example of a method for creating shadow directories and files in the VTL 166, in accordance with an embodiment of the invention. At step 310, one or more tapes in the tape library 164 are examined. Accordingly, the archive manager 168 examines data stored on the tapes 177-A, 177-B, etc., for example. At step 320, one or more directories stored on the tape(s) are identified. Thus, the archive manager 168 identifies one or more directory structures stored on the tapes 177-A, 177-B, etc., for example. One or more files stored in the tape library 164 are also identified, at step 330.

At step 340, for each directory identified on the tape(s), a "shadow directory" is created in the VTL 166. In general, a shadow directory comprises a directory that corresponds to a specified directory stored in a specified storage system/device. In one example, a shadow directory comprises a format and structure that are similar to the structure of the corresponding directory on the tape(s). However, in other examples, the shadow directory may be generated using a different format or different protocols suitable to the operating system used in the VTL. Also, in other examples, a shadow directory may have a structure different from the corresponding directory stored on the tape(s). For example, a shadow directory may be created with a different structure in order to organize data files more efficiently. Accordingly, the archive manager 168 creates on the disk drives 172 a corresponding directory for each directory that was identified at step 320.

At step 350, for each file on the tape(s), a corresponding "shadow file" is created in the VTL 166. In one example, a shadow file is a data structure in the VTL 166 having a name and path similar to the corresponding file in the tape library 164; however, the shadow file does not contain the file data itself. Alternatively, a shadow file may have a different path and/or a different name. Accordingly, the archive manager 168 creates in the VTL 166 a corresponding "shadow file" for each file identified in step 330.

Figure 4:
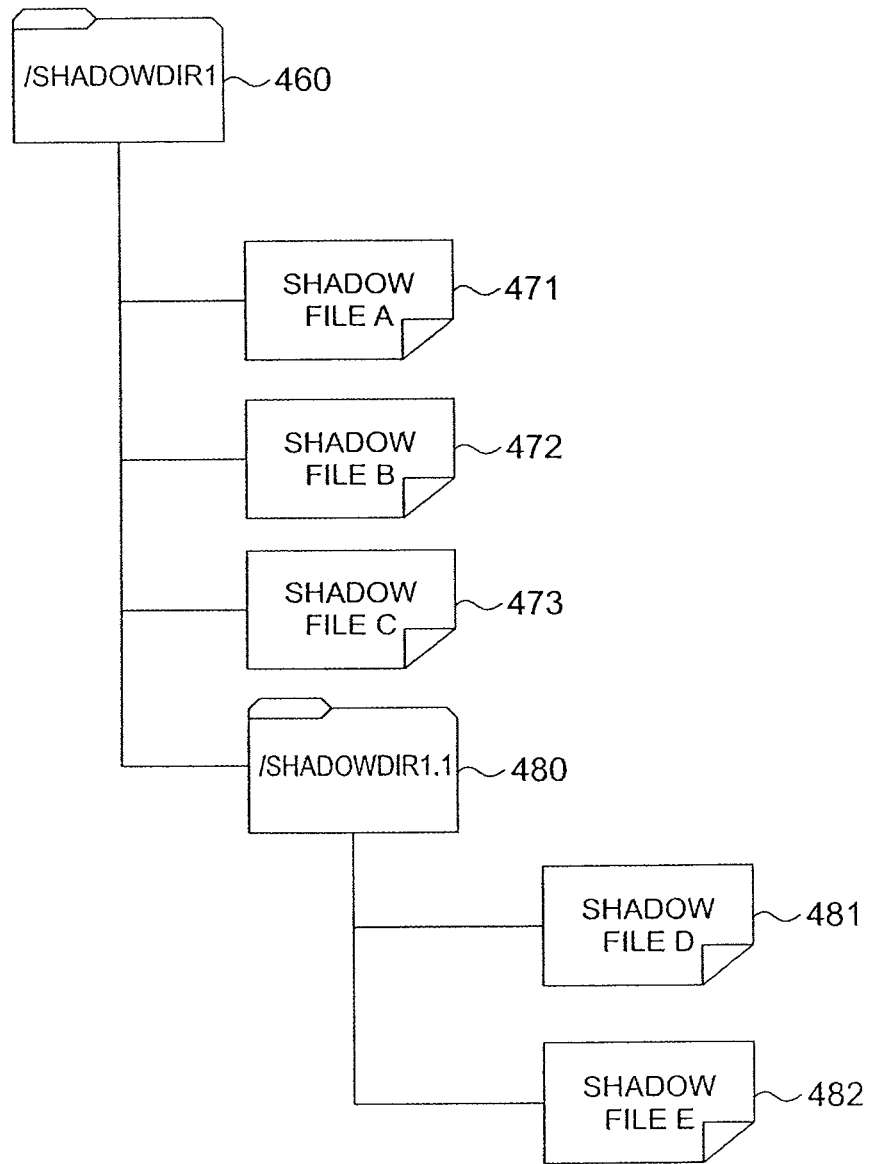
FIG. 4 shows an example of a shadow directory stored in a VTL, resulting from the method of FIG. 3.

FIG. 4 shows a shadow directory 460 stored in the VTL 166, in accordance with an embodiment of the invention. In this example, the shadow directory 460 corresponds to the directory 1.1 (255) shown in FIG. 2. Shadow directory 460 comprises several shadow files 471, 472 and 473, corresponding to Files A, B, and C, respectively. Shadow directory 460 also comprises a subdirectory 480 corresponding to subdirectory 1.1 (257) shown in FIG. 2. Shadow subdirectory 480 contains shadow files 481 and 482, corresponding to File D and File E, respectively.

Figure 5:
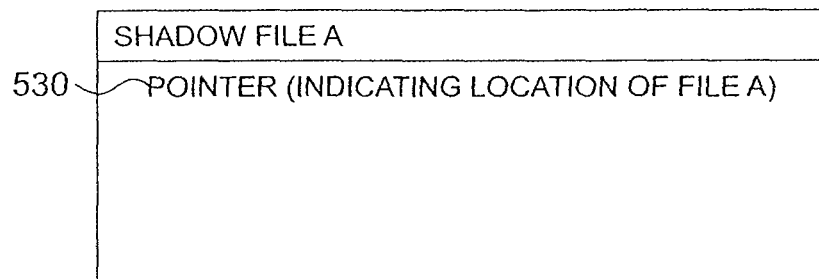
FIG. 5 shows an example of a shadow file, resulting from the method of FIG. 3.

At step 360, a pointer is stored in each shadow file created in the VTL 166, indicating the location of the corresponding file on the tape(s). Thus, the archive manager 168 stores in each shadow file a pointer to the location of the data of the corresponding file stored on the tapes 177-A, 177-B, etc. FIG. 5 shows an example of the shadow file 471, which corresponds to File A, in accordance with an embodiment of the invention. In this example, the shadow file A (471) contains a pointer 530 to the location of the File A data stored in the tape library 164. In this example, the pointer 530 may comprise data, such as an address, indicating the location of File A. It should be understood that in some cases a pointer may comprise more than one address if, for example, the data associated with a file is stored in multiple locations. In an alternative example, a shadow file may comprise other forms of information. For example, a shadow file may comprise a value representing the corresponding file, such as a hash value or algorithmic representation of the file. It should also be noted that the original file may be transferred from the tape library 164 to a different location such as another storage system or tape library. In such case the pointer in a shadow file may point to the new location of the data file.

After the shadow directories and shadow files are created in the VTL 166 in accordance with the routine set forth in FIG. 3, for example, the shadow directories and shadow files may be presented to the media server 110, to users, or to the client devices 106 as an indication of the data stored in the original tape library 164. Thereafter, when a data processing request pertaining to a data file stored in the original tape library, such as a read request, is received from a client device, the corresponding shadow file is accessed. The pointer is examined, and the data at the indicated location is retrieved and provided in response to the request.

In an illustrative example, after the shadow directory 460 (shown in FIG. 4) is created in the VTL 166, the archive manager 168 presents to the media server 110 the shadow directory 460, in lieu of the directory 255, as an indication of the data stored in File A, File B, File C, File D, and File E (shown in FIG. 2). Thereafter, the media server 110 directs all subsequent requests to store or retrieve data pertaining to the shadow directory 460, or any of the shadow files therein, to the VTL 166.

Figure 6:
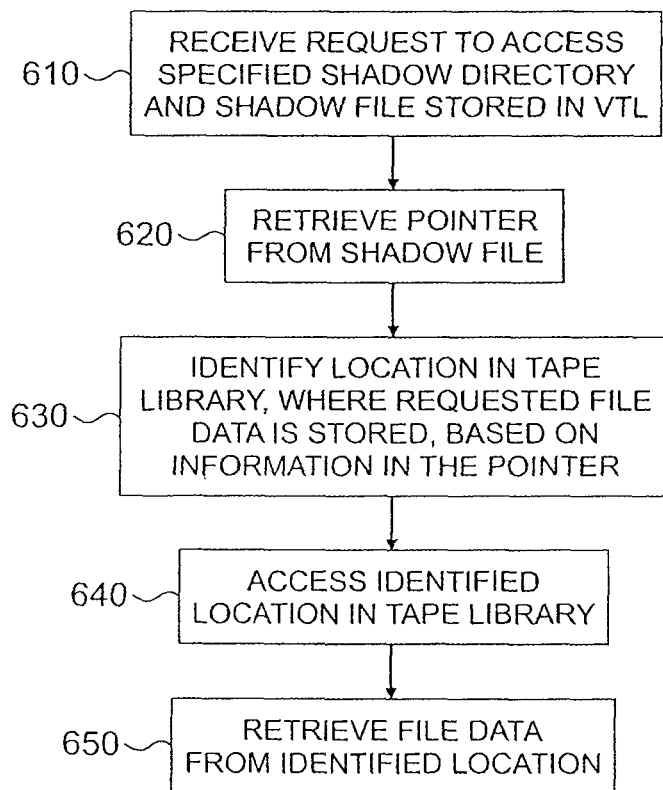
FIG. 6 is a flowchart depicting an example of a method to access stored data, in accordance with the embodiment of FIG. 1.

FIG. 6 is a flowchart depicting an example of a method for using shadow directories and shadow files to access stored data, in accordance with an embodiment of the invention. Supposing that the media server 110 receives from the client computer 106-A a request to read data from shadow file A (471), the media server 110 directs the request to the VTL 166. At step 610, a request to access a specified shadow directory and shadow file stored in the VTL is received. In this example, the request to read data from shadow file A in shadow directory 460 is received by the archive manager 168. In response to the request, the archive manager 168 accesses the specified shadow directory 460, and the specified shadow file A (471). At step 620, a pointer is retrieved from the specified shadow file. Thus, the archive manager 168 retrieves the pointer 530 from the shadow file A (471).

At step 630, a location in the tape library 164 where the requested file data is stored is identified based on information in the pointer. Accordingly, the archive manager 168 uses the pointer 530 to identify a location on the tapes 177 where the requested data is stored. In this case, the pointer 530 indicates a location on the tapes 177 where the date for File A is stored. At step 640, the identified location in the tape library is accessed, and at step 650 the file data is retrieved from the location. In this example, the archive manager 168 accesses the location on the tapes 177 where the data for the file A is stored and retrieves the file data. In this example, the file data is provided to the media server 110, which in turn transmits the file data to the client computer 106-A to satisfy the read request.

File Object Database

To facilitate the storage of data, the archive manager 168 may maintain one or more databases in the VTL 166. For example, the archive manager 168 may create and maintain in the VTL 166 a database in the form of a file object database comprising a file directory structure containing files and folders. The technique of storing data in object oriented databases is well-known. Within a file object database, file objects are data structures that contain the actual data that is within the corresponding file and metadata associated with the file. If multiple versions of a file exist, the versions are all stored within the same file object. One example of a file object database that may be used by the archive manager 168 to store data in the VTL 166 is described in U.S. Patent Application No. 60/762,058, entitled "Method and System for Storing Data," filed Jan. 25, 2006 (the '058 Application"), which is assigned to the assignee of the present invention and incorporated herein by reference in its entirety. U.S. patent application Ser. No. 11/657,283, which was filed on Jan. 24, 2007 and was published on Aug. 25, 2007 bearing U.S. Patent Application No. 2007/0198659 A1, claims the priority of the '058 application. Alternatively, the archive manager 168 may store data using a relational database or any other appropriate data structure.

The archive manager 168 may dynamically allocate the disk space on the disk drives 172 in the VTL 166 by assigning disk space to a virtual disk drive as needed. An example of such a method for dynamically allocating disk space can be found in U.S. patent application Ser. No. 10/052,208, entitled "Dynamic Allocation of Computer Memory," filed Jan. 17, 2002 (the "'208 Application"), which is assigned to the assignee of the present invention and is incorporated herein by reference in their entireties. The dynamic allocation method described in the '208 Application functions on a drive level. In such instances, disk drives that are managed by the archive manager 168 are defined as virtual drives. Virtual drive systems allow an algorithm to manage a "virtual" disk drive having assigned to it an amount of virtual storage that is larger than the amount of available physical storage. Accordingly, large disk drives can virtually exist on a system without requiring an initial investment of an entire storage subsystem. Additional storage may then be added as required without committing these resources prematurely. Alternatively, a virtual disk drive may have assigned to it an amount of virtual storage that is smaller than the amount of available physical storage.

According to the virtual drive system described in the '208 Application, when the archive manager 168 initially defines a virtual storage device, or when additional storage is assigned to the virtual storage device, the disk space on the storage devices is divided into storage segments (not to be confused with "file segments" described below). Each storage segment has associated with it segment descriptors, which are stored in a free segment list in memory. Generally, a segment descriptor contains information defining the storage segment it represents; for example, the segment descriptor may define a home storage device location, physical starting sector of the segment, sector count within the storage segment, and storage segment number.

As storage segments are needed to store data, the next available segment descriptor is identified from the free segment list, the data is stored in the storage segment, and the segment descriptor is assigned to a new table called a storage segment map, for example. The storage segment map maintains information representing how each storage segment defines the virtual storage device. More specifically, the storage segment map provides the logical sector to physical sector mapping of a virtual storage device. After the free segment descriptor is moved or stored in the appropriate area of the storage segment map, the storage segment is no longer a free storage segment but is now an allocated storage segment.

Backup Agent

Figure 7:
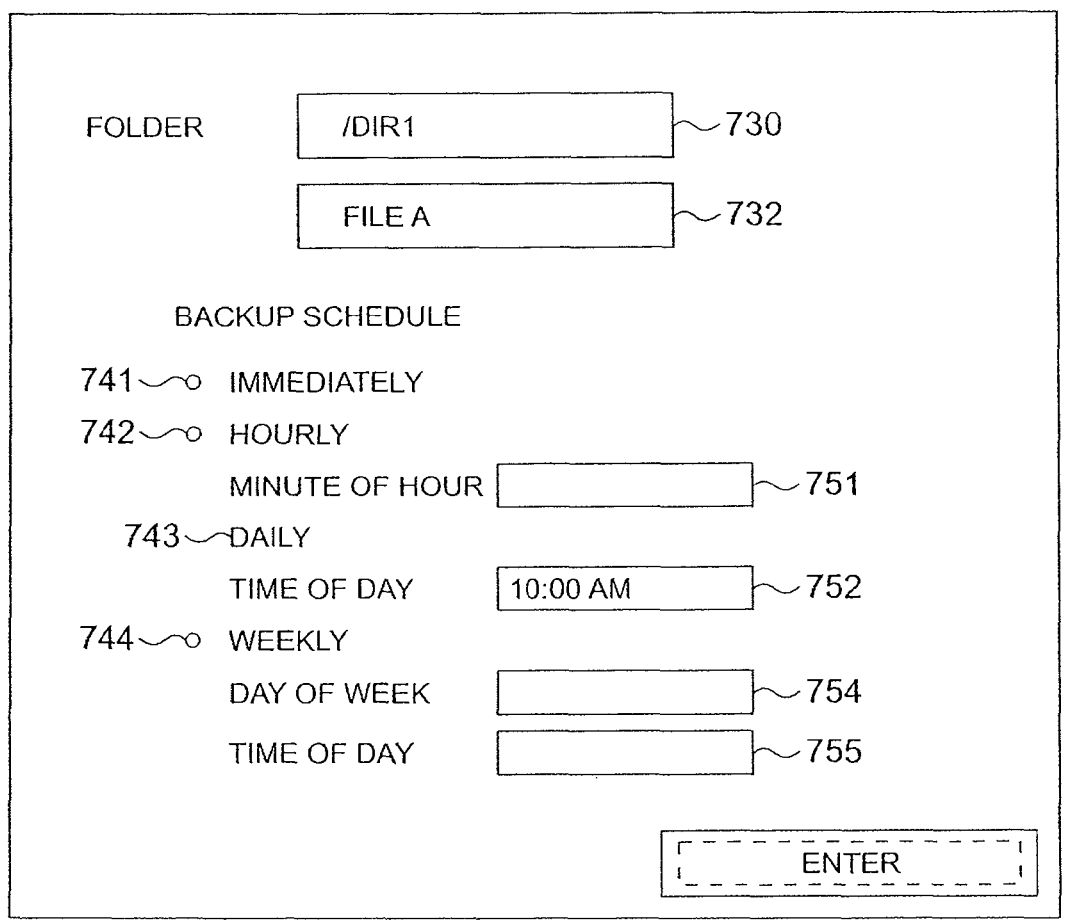
FIG. 7 shows an example of a GUI that may be displayed to a user of a client computer, in accordance with an embodiment of the invention.

The backup agent 107-A (FIG. 1) may cause data to be backed up in accordance with one or more backup policies established by a user without system administrator rights (or similar authority), for example. To enable a user without system administrator rights to establish such backup policies, the backup agent 107-A may make available a graphical user interface (GUI) to a user of the client 106-A. FIG. 7 shows an example of a GUI 757 that may be displayed to a user of the client 106-A. The GUI 757 may be accessible to a user from within a directory application, such as Windows Explorer. For example, the backup agent 107-A may automatically display the GUI 757 on a display screen associated with the client 106-A when the user at the client 106-A selects, via Microsoft Explorer, a data set (which may include one or more files or folders, for example), and then presses a predetermined key on the keyboard or performs another predetermined action such as "right-clicking" on a computer mouse, and selects a desired option.

For example, a user of client 106-A may invoke a web browser application, such as Windows Explorer, to examine various folders and files stored in the local storage 109-A. The user may wish to back up the contents of a desired file by using a computer mouse to select the file on the screen, and then "right-clicks" on the computer mouse and selects a desired option. In response, the backup agent 107-A causes the GUI 757 to appear on the screen. The GUI 757 includes fields specifying a folder (field 730) and a file (field 732). Fields 730 and 732 may be completed automatically by the backup agent 107-A based on the file and/or folder selected by the user via Windows Explorer, for example. Thus, in this example fields 730 and 732 indicate "/Dir1" and "FILE A," in accordance with the user's selections. The GUI 757 additionally includes options selectable by the user for specifying a backup schedule. In this example, the user may select whether the specified folder or file is to be backed up immediately (option 741), hourly (option 742), daily (option 743) or weekly (option 744). Fields 751, 752, 754, and 755 allow the user to more precisely specify a day of the week, time of day, and minute of the hour, as appropriate, at which the data is to be backed up, for example. Other options may be presented. The user may select one or more of the available options to inform the backup agent 107-A when the specified data set is to be backed up. The backup agent 107-A stores the user's selections in the local storage 109-A. The backup agent 107-A may also communicate the user's selections to the archive manager 168 and/or to the backup module 115. The backup agent 107-A may communicate directly with the archive manager 168 along the path 138, for example.

After the user selects a data set to back up, and establishes one or more policies for backing up the selected data set, the backup agent 107-A backs up the data set in accordance with the specified policies. Referring now to the field 752 of FIG. 7, suppose that the user of the client 106-A specifies that FILE A is to be backed up daily, at 10:00 AM each day. The backup agent 107-A monitors an internal clock (not shown) within the client 106-A and, based on the user's specified parameters, begins to back up the data in FILE A when the clock indicates that the time is 10:00 AM.

Automatic Restore Function

A user of the client computer 106-A, without system administrator rights, may also cause data to be restored automatically, in accordance with an embodiment of the invention. By way of example, let us suppose that the user discovers that the copy (or copies) or File A stored in the local storage 109-A has (have) become corrupted, and wishes to restore the data using the most recent version of File A stored in the VTL 166. Accordingly, the user, operating from the client computer 106-A, invokes a web browser application, such as Windows Explorer, to examine various folders and files stored in the VTL 166. In this example, the user "right clicks" on the computer mouse and selects a desired option. In response, the backup agent 107-A requests from the archive manager 168 a current list of directories and files in the VTL 166. The backup agent 107-A may communicate directly with the archive manager 168 via the path 138, for example. In response, the archive manager 168 provides to the backup agent 107-A a current list of directories and files that are stored in the VTL 166 and accessible to the user. The backup agent 107-A causes the list to be displayed on the terminal of the client computer 106-A. Alternatively, the backup agent 107-A transmits a request for a current list of directories and files in the VTL 166 to the backup module 115, which forwards the request to the archive manager 168. In this case, the archive manager 168 provides the current list to the backup module 115, which causes the information to be displayed on the user's terminal.

Figure 8:
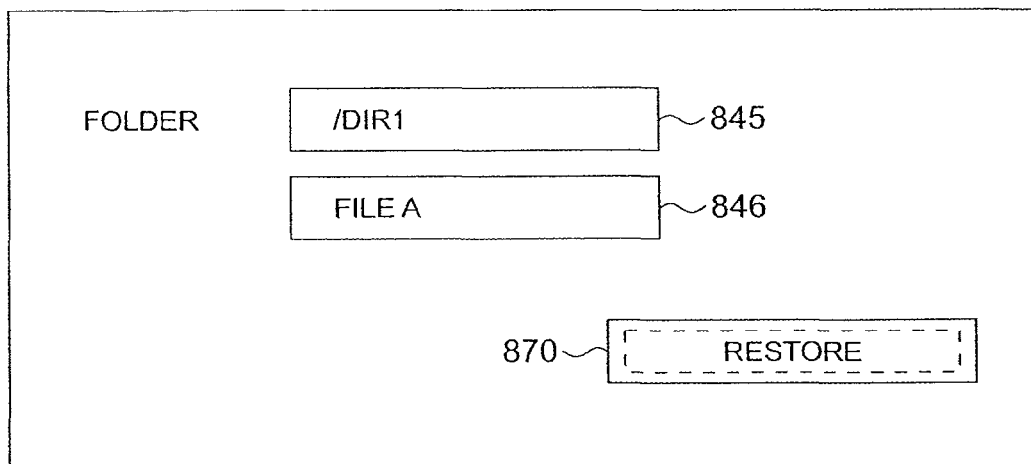
FIG. 8 shows another example of a GUI that may be displayed to a user of a client computer, in accordance with an embodiment of the invention.

The user examines the directories and files in the list, selects a desired data set, in this example File A, and selects another desired option. In response, the backup module 115 causes a GUI, such as that shown in FIG. 8, to be displayed on the user's terminal. The GUI 822 includes fields specifying a folder (field 845) and a file (field 846). Fields 845 and 846 may be completed automatically by the backup agent 107-A based on the data set selected by the user via Windows Explorer. Thus, in this example fields 845 and 846 indicate "/Dir1" and "FILE A," in accordance with the user's selections. The user then clicks the "Restore" button 870 on GUI 822, and in response, the archive manager 168 retrieves the current version of File A stored in the VTL 166 and transmits it to the backup agent 107-A. The backup agent 107-A causes the copy of File A to be stored in the local storage 109-A.

Representing Data within a VTL

Figure 9:
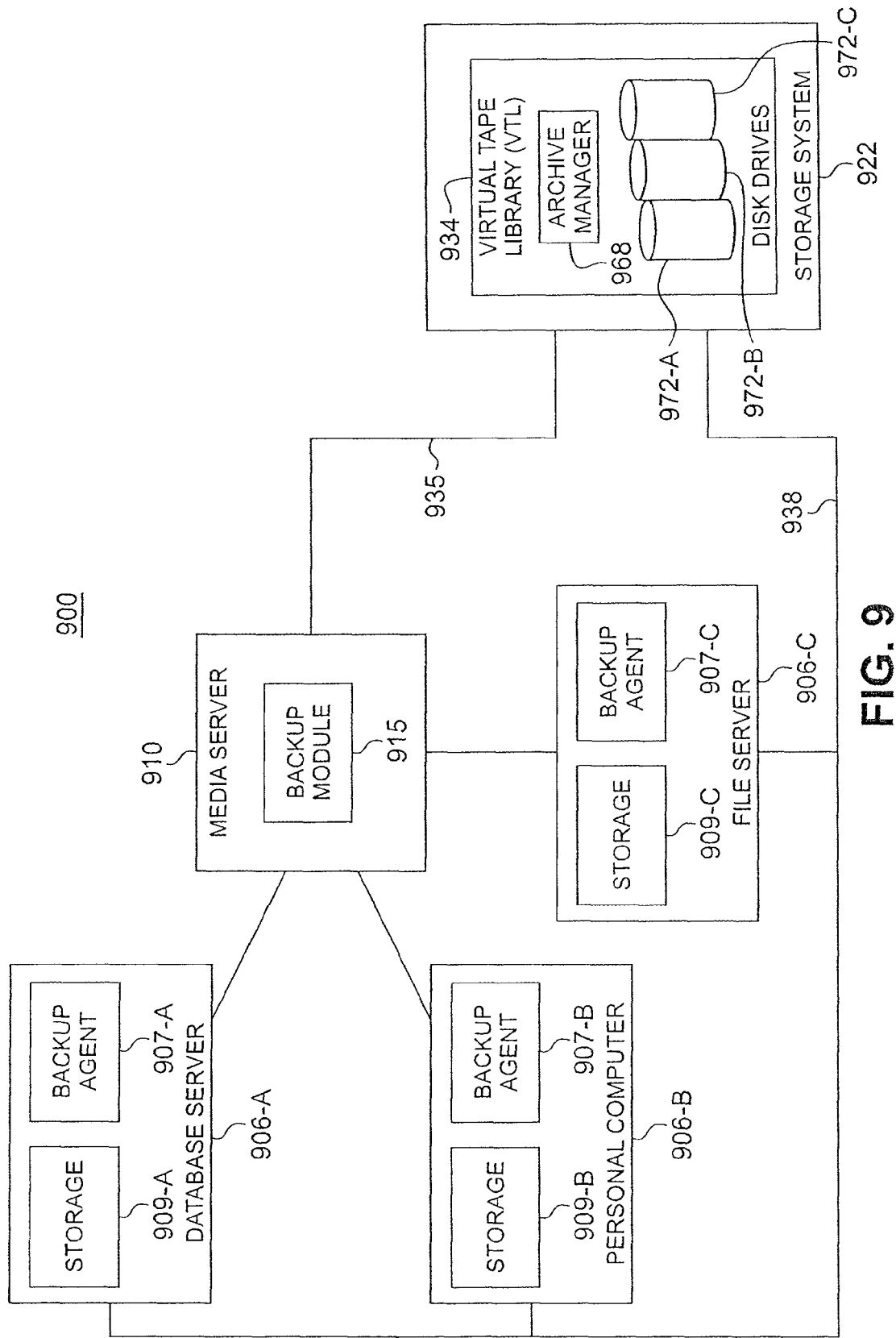
FIG. 9 is a block diagram of an example of a system that may be used to store data, in accordance with another embodiment of the invention.

In an alternative embodiment of the invention, the methods described above may be used to represent data stored in a VTL. FIG. 9 is a block diagram of an example of a system 900 that may be used to store data, in accordance with this embodiment. The system 900 comprises a storage system 922, a media server 910, and one or more client computers 906.

In this example, three clients 906-A, 906-B, and 906-C are illustrated. The client computer 906-A comprises a database server, the client computer 906-B comprises a personal computer, and the client computer 906-C comprises a file server. It should be noted that although three particular client computers are shown in this example, any number of client computers of any type may be connected to the media server 910.

Each client computer 906 comprises a local storage 909 and a respective backup agent 907. Thus, the client 906-A comprises the local storage 909-A and a backup agent 907-A, the client 906-B comprises the local storage 909-B and a backup agent 907-B, and the client 906-C comprises the local storage 909-C and a backup agent 907-C. Each client computer 906 is connected to the media server 910. Each client computer 906 is also connected directly to the storage system 922 via path 938.

For convenience, the discussion below will be limited to the client 906-A, the local storage 909-A and the backup agent 907-A; however, it should be noted that any references to the client 906-A (and/or to the local storage 909-A or the backup agent 907-A) apply equally to other client computers that may communicate with the media server 910 (and their associated storage and backup agents, as appropriate).

The local storage 909-A may comprise one or more disk drives, for example. The backup agent 907-A monitors data stored in the local storage 909-A of the client 906-A and from time to time causes selected data to be backed up. Accordingly, the backup agent 907-A may selectively retrieve data from the local storage 909-A and transmit the data to the media server 910 to be backed up. The backup agent 907-A may transmit selected data to the backup module 915 with a request to backup the data. The backup agent 907-A may comprise a software application, specialized circuitry, or a combination of software and circuitry.

The media server 910 comprises a computer, such as a server, a personal computer, etc. The media server 910 also comprises a backup module 915, which causes data to be backed up in the storage system 922. The backup module 915 facilitates the backup of data received from the backup agent 907-A. For example, the backup module 915 may from time to time receive from the backup agent 907-A a request to backup data, and in response cause the data to be backed up in the storage system 922. The backup module 915 may comprise a software application, specialized circuitry, or a combination of software and circuitry.

The storage system 922 comprises one or more storage devices capable of storing data, such as disk drives, optical disks, etc. The storage system 922 also comprises a virtual tape library (VTL) 934. The VTL 934 may comprise software residing in the storage system 922, or alternatively, hardware or a combination of software and hardware. In the example of FIG. 9, the storage system 922 comprises three disk drives 972-A, 972-B, and 972-C, which are used to implement the VTL 934. The storage system 922 is connected to the media server 910 via a path 935, which may comprise a SCSI connection, a Fibre Channel connection, a network, or any other suitable type of connection. It should be understood that while in the example of FIG. 9, three disk drives 972-A, 972-B, and 972-C are shown, a storage system may comprise any number of disk drives or other storage devices. It should also be understood that while the disk drives 972-A, 972-B, and 972-C are used to implement the virtual tape library (VTL) 934, the storage system 922 may also comprise additional storage devices not associated with the VTL 934.

In this example, the VTL 934 is used to emulate a selected tape library (which is no longer connected to the system 900). Thus, data may be stored in the VTL 934 in a format that emulates the format used by the selected tape library. For example, the VTL 934 may store one or more directories and files similar to those shown in FIG. 2.

The VTL 934 operates in a manner similar to the VTL 166 of FIG. 1, which is described above. The VTL 934 comprises an archive manager 968, which functions in a manner similar to the archive manager 168 of FIG. 1, which is also described above. Thus, the archive manager 968 manages the storage and retrieval of data in the VTL 934. The archive manager 968 may from time to time receive from the media server 910 a request to store data. In response, the archive manager 968 stores the data in an appropriate location or locations on the disk drives 972. The archive manager 968 may also from time to time receive from the media server 910 a request to retrieve one or more data files. In response to such a request, the archive manager 968 identifies the location of the requested data file, retrieves a copy of the data file and provides the data file to the media server 910. The archive manager 968 may comprise software, hardware, or a combination of software and hardware. In the example of FIG. 9, the archive manager 968 comprises a software application residing on the storage system 922.

In this example, the archive manager 968 has the capability to examine selected data stored in the VTL 934, identify one or more directories and one or more data files, and create in the VTL 934 one or more corresponding directories and one or more corresponding files.

Alternatively, the backup module 915 may perform the tasks of examining data stored in the VTL 934, identifying one or more directories and one or more data files, and creating in the VTL 934 one or more corresponding shadow directories and one or more corresponding shadow files.

It should be noted that some or all of the functions of the backup module 915, or of the archive manager 968, described herein may be performed by one or more of the backup agents 907-A, 907-B, 907-C, etc., residing in the client computers 906-A, 906-B, 906-C, etc. For example, while certain communications are described herein as involving a first communication between the backup agent 907-A and the backup module 915 and a second communication between the backup module 915 and the VTL 934, the backup agent 907-A may transmit a corresponding communication directly to the VTL 934.

In accordance with this embodiment of the invention, one or more shadow directories and one or more shadow files are created to emulate selected directories and files stored in the VTL 934 (i.e., on the disk drives 972). In this example, the shadow directories and shadow files are also stored in the VTL 934.

Figure 10:
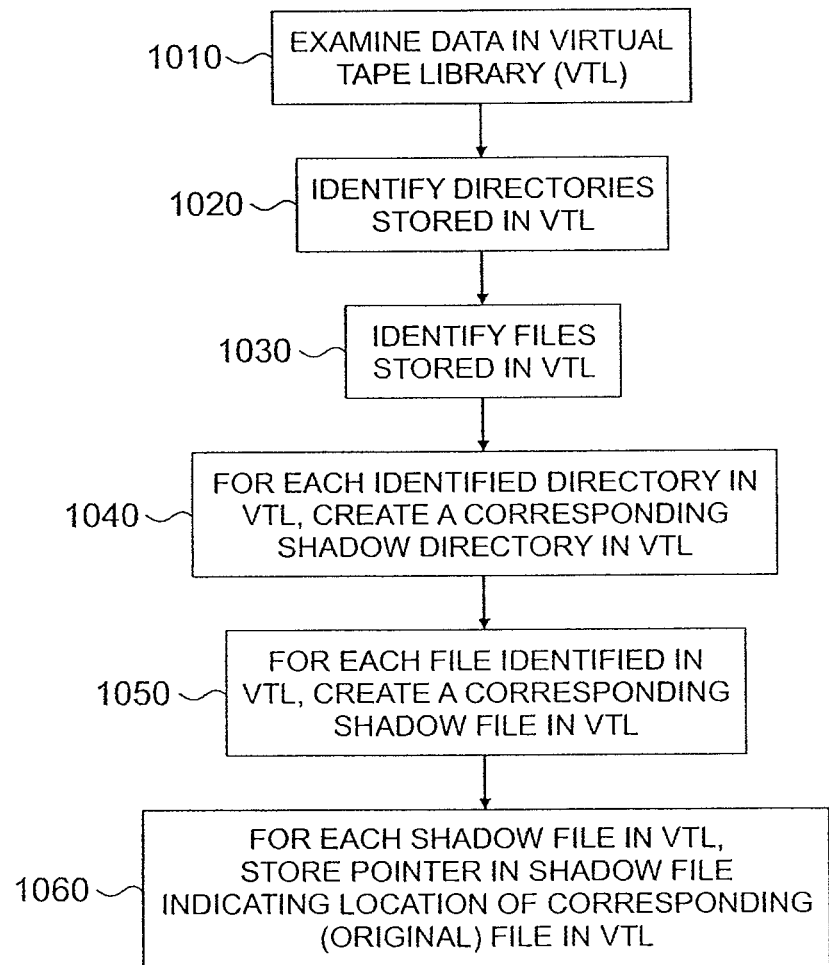
FIG. 10 is a flowchart of an example of a method for creating shadow directories and files in a VTL, in accordance with an embodiment of the invention.

FIG. 10 is a flowchart of an example of a method for creating shadow directories and files in the VTL 934, in accordance with this embodiment of the invention. At step 1010, selected data stored in the VTL 934 is examined. Accordingly, the archive manager 968 may examine selected data stored on the disk drives 972. At step 1020, one or more directories stored in the VTL 934 are identified. Thus, the archive manager 968 identifies one or more directory structures stored on the disk drives 972. One or more files stored in the VTL 934 are also identified, at step 1030.

At step 1040, for each directory identified in the VTL 934, a shadow directory is created and stored in the VTL 934. Accordingly, the archive manager 968 creates in the VTL 934 a corresponding shadow directory for each directory that was identified at step 1020. The shadow directories are stored on the disk drives 972. At step 1050, for each file identified at step 1030, a corresponding shadow file is created and stored in the VTL 934. The shadow files are stored on the disk drives 972.

At step 1060, a pointer is stored in each shadow file created in the VTL 934, indicating the location of the corresponding (original) file in the VTL 934. In one example, the pointer may comprise data, such as an address, indicating the location of the corresponding file. In some cases a pointer may comprise more than one address if, for example, the data associated with a file is stored in multiple locations. In an alternative example, a shadow file may comprise other forms of information. For example, a shadow file may comprise a value representing the corresponding file, such as a hash value or an algorithmic representation of the file. It should also be noted that the original file may be transferred from the VTL 934 to a different location such as another storage system or tape library, or another VTL. In such case the pointer in a shadow file may point to the new location of the data file.

After the shadow directories and shadow files are created in the VTL 934 in accordance with the routine set forth in FIG. 10, for example, the shadow directories and shadow files may be presented to the media server 910, to users, or to the client devices 906 as an indication of the original data stored in the VTL 934. Thereafter, when a data processing request pertaining to a shadow directory and/or a shadow file, such as a read request, is received from a client device, the specified shadow directory and/or shadow file are accessed. The pointer is examined, and the data at the indicated location is retrieved and provided in response to the request.

Figure 11:
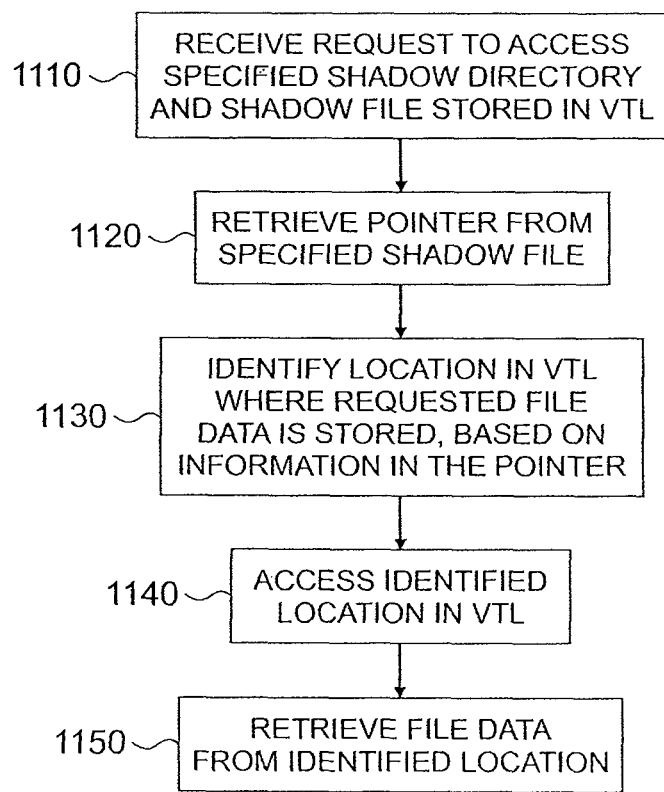
FIG. 11 is a flowchart of an example of a method to access stored data, in accordance with an embodiment of the invention.

FIG. 11 is a flowchart depicting an example of a method for using shadow directories and shadow files to access stored data, in accordance with the embodiment of FIG. 9. Supposing that the media server 910 receives from the client computer 906-A a request to read data stored in a specified shadow directory and shadow file in the VTL 934, the media server 910 directs the request to the archive manager 968. At step 1110, a request to access a specified shadow directory and a specified shadow file stored in the VTL is received. In this example, the request to read data from the specified shadow directory and file is received by the archive manager 968. In response to the request, the archive manager 968 accesses the specified shadow directory and shadow file. At step 1120, a pointer is retrieved from the specified shadow file. Thus, the archive manager 968 retrieves the pointer from the specified shadow file.

At step 1130, a location in the VTL 934 where the requested file data is stored is identified based on information in the pointer. Accordingly, the archive manager 968 uses the pointer to identify a location in the disk drives 972 where the requested data is stored. At step 1140, the identified location in the VTL is accessed, and at step 1150 the file data is retrieved from the location. In this example, the archive manager 968 accesses the location in the VTL 934 where the requested data is stored and retrieves the file data. The file data is provided to the media server 910, which in turn transmits the file data to the client computer 906-A to satisfy the read request.

File Object Database

To facilitate the storage of data, the archive manager 968 may maintain one or more databases in the VTL 934. For example, the archive manager 968 may create and maintain in the VTL 934 a database in the form of a file object database comprising a file directory structure containing files and folders. The technique of storing data in object oriented databases is well-known and discussed above. One example of a file object database that may be used by the archive manager 968 to store data in the VTL 934 is described in the '058 Application, which is discussed above.

The archive manager 968 may dynamically allocate the disk space on the disk drives 972 by assigning disk space to a virtual disk drive as needed. An example of such a method for dynamically allocating disk space can be found in the '208 Application, which is discussed above.

Backup Agent

Figure 12:
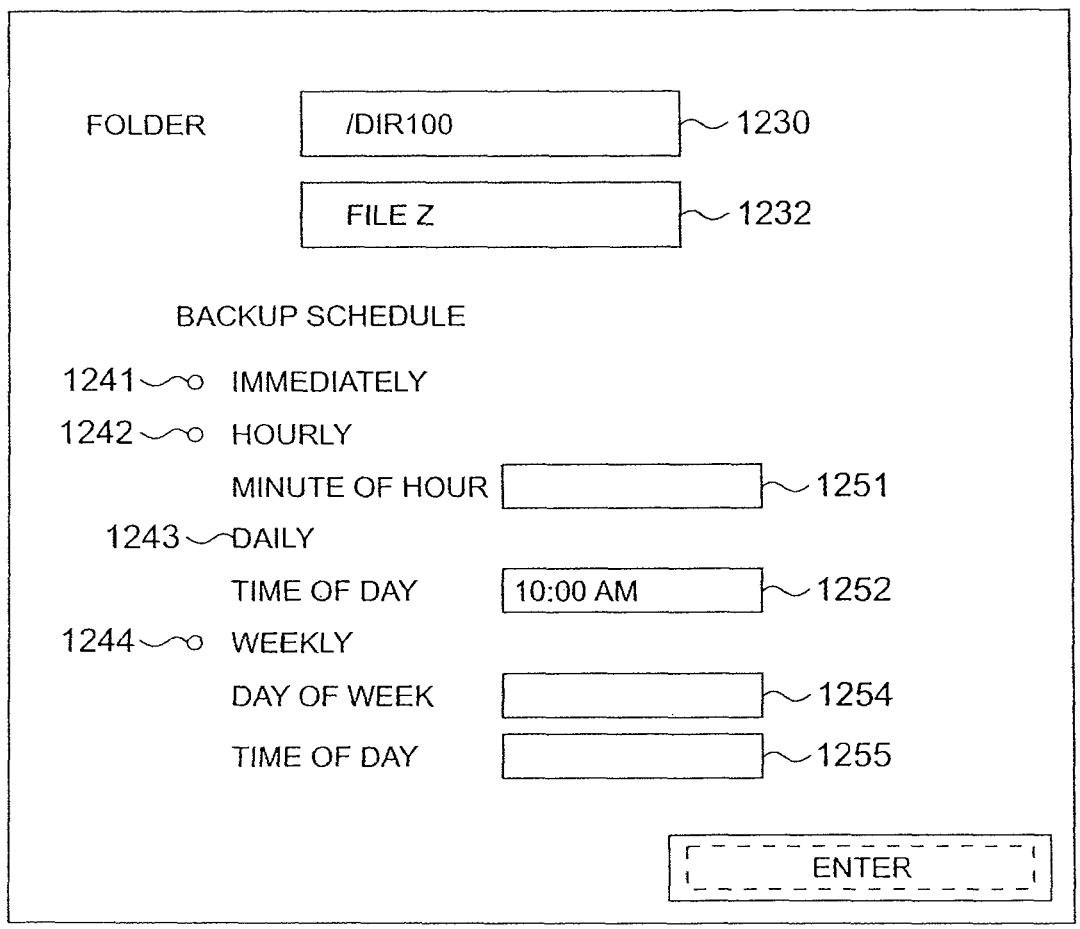
FIG. 12 shows an example of a GUI that may be displayed to a user of a client computer, in accordance with another embodiment of the invention.

The backup agent 907-A (FIG. 9) may cause data to be backed up in accordance with one or more backup policies established by a user without system administrator rights (or similar authority), for example. To enable a user without system administrator rights to establish such backup policies, the backup agent 907-A may make available a graphical user interface (GUI) to a user of the client 906-A. FIG. 12 shows an example of a GUI 1257 that may be displayed to a user of the client 906-A. The GUI 1257 may be accessible to a user from within a directory application, such as Windows Explorer. For example, the backup agent 907-A may automatically display the GUI 1257 on a display screen associated with the client 906-A when the user at the client 906-A selects, via Microsoft Explorer, a data set (which may include one or more files or folders, for example), and then presses a predetermined key on the keyboard or performs another predetermined action such as "right-clicking" on a computer mouse, and selects a desired option.

For example, a user of client 906-A may invoke a web browser application, such as Windows Explorer, to examine various folders and files stored in the local storage 909-A. The user may wish to back up the contents of a desired file by using a computer mouse to select the file on the screen, and then "right-clicks" on the computer mouse and selects a desired option. In this example, the user is interested in backing up a File Z (not shown) stored in a directory identified as "Dir100", which are stored in the local storage 909-A. Thus, in response to the user's actions, the backup agent 907-A causes the GUI 1257 to appear on the screen. The GUI 1257 includes fields specifying a folder (field 1230) and a file (field 1232). Fields 1230 and 1232 may be completed automatically by the backup agent 907-A based on the file and/or folder selected by the user via Windows Explorer, for example. Thus, in this example fields 1230 and 1232 indicate "/Dir100" and "FILE Z," in accordance with the user's selections. The GUI 1257 additionally includes options selectable by the user for specifying a backup schedule. In this example, the user may select whether the specified folder or file is to be backed up immediately (option 1241), hourly (option 1242), daily (option 1243) or weekly (option 1244). Fields 1251, 1252, 1254, and 1255 allow the user to more precisely specify a day of the week, time of day, and minute of the hour, as appropriate, at which the data is to be backed up, for example. Other options may be presented. The user may select one or more of the available options to inform the backup agent 907-A when the specified data set is to be backed up. The backup agent 907-A stores the user's selections in the local storage 909-A. The backup agent 907-A may also communicate the user's selections to the archive manager 968 and/or to the backup module 915. The backup agent 907-A may communicate directly with the archive manager 968 along the path 938, for example.

After the user selects a data set to back up, and establishes one or more policies for backing up the selected data set, the backup agent 907-A backs up the data set in accordance with the specified policies. Referring now to the field 1252 of FIG. 12, suppose that the user of the client 906-A specifies that FILE Z is to be backed up daily, at 10:00 AM each day. The backup agent 907-A monitors an internal clock (not shown) within the client 906-A and, based on the user's specified parameters, begins to back up the data in FILE Z when the clock indicates that the time is 10:00 AM.

Automatic Restore Function

A user of the client computer 906-A, without system administrator rights, may also cause data to be restored automatically, in accordance with an embodiment of the invention. By way of example, let us suppose that the user discovers that the copy (or copies) of File Z stored in the local storage 909-A has (have) become corrupted, and wishes to restore the data using the most recent version of File Z stored in the VTL 934. Accordingly, the user, operating from the client computer 906-A, invokes a web browser application, such as Windows Explorer, to examine various folders and files stored in the VTL 934. In this example, the user "right clicks" on the computer mouse and selects a desired option. In response, the backup agent 907-A requests from the archive manager 968 a current list of directories and files in the VTL 934. In response, the archive manager 968 provides to the backup agent 907-A a current list of directories and files that are stored in the VTL 934 and accessible to the user. The backup agent 907-A communicates directly with the archive manager 968 via the path 938. The backup agent 907-A causes the list to be displayed on the terminal of the client computer 906-A.

Figure 13:
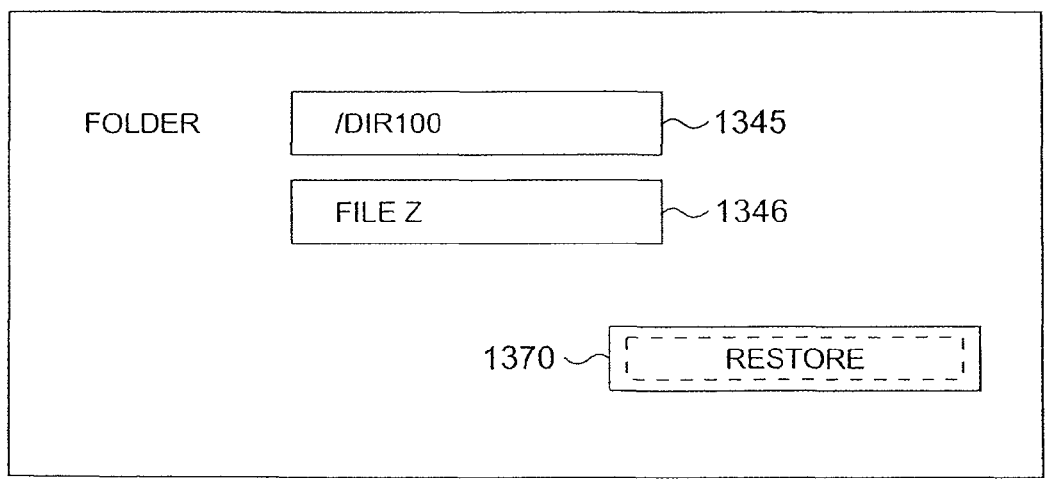
FIG. 13 shows another example of a GUI that may be displayed to a user of a client computer, in accordance with another embodiment of the invention.

The user examines the directories and files in the list, selects a desired data set, in this example File Z, and selects another desired option. In response, the backup agent 907-A causes a GUI, such as that shown in FIG. 13, to be displayed on the user's terminal. The GUI 1322 includes fields specifying a folder (field 1345) and a file (field 1346). Fields 1345 and 1346 may be completed automatically by the backup agent 907-A based on the data set selected by the user via Windows Explorer. Thus, in this example fields 1345 and 1346 indicate "/Dir100" and "FILE Z," in accordance with the user's selections. The user then clicks the "Restore" button 1370 on GUI 1322, and in response, the archive manager 968 retrieves the current version of File Z stored in the VTL 934 and transmits it to the backup agent 907-A. The backup agent 907-A causes the copy of File Z to be stored in the local storage 909-A.

The foregoing merely illustrates the principles of the invention. It will thus be appreciated that those skilled in the art will be able to devise numerous other arrangements which embody the principles of the invention and are thus within its spirit and scope, as defined by the claims below.

For example, the system 100 and the system 900 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. A method for performing a data processing operation, comprising:
prior to receiving a respective request to perform a data processing operation:
examining selected data stored on a first storage medium by a processing device;
identifying within the examined, selected data one or more first directories containing one or more respective first data files, by the processing device, the first data files containing stored data;
for at least one of the identified first directories, generating, by the processing device, a respective second directory;
for at least one of the first data files contained in a respective identified first directory, generating by the processing device, a respective second file based at least in part on the corresponding first data file, wherein each second file comprises an indicator identifying a memory location of the corresponding first data file in the first storage medium, without the data in the respective corresponding first data file, wherein the one or more first directories and the one or more respective first data files are different types of files;
storing the at least one second directory and the respective second files in a second storage medium, wherein the second storage medium is remote from the client device; and
after storing the at least one second directory and the respective second files:
receiving from the user via the client device the respective request, wherein the respective request comprises a request to perform a data processing operation on a specified second file;
examining the indicator in the specified second file while the specified second file is located in the second storage medium to determine the memory location of the corresponding first data file in the first storage medium, in response to the request to perform the data processing operation on the specified second file;
accessing the first data file located in the first storage medium via the indicator located in the specified second file in the second storage medium; and performing the requested data processing operation on the first data file corresponding to the specified second file, in response to the request to perform the data processing operation on the specified second file.

2. The method of claim 1, wherein the first storage medium comprises a tape library.

3. The method of claim 2, wherein the second storage medium comprises a virtual tape library (VTL).

4. The method of claim 3, comprising accessing the first file from the tape library.

5. The method of claim 1, wherein the first storage medium comprises a VTL.

6. The method of claim 5, comprising accessing the first file from the VTL.

7. The method of claim 5, wherein the second storage medium comprises a VTL.

8. The method of claim 1, wherein:
the first storage medium comprises a first non-tape storage medium; and
the second storage medium comprises a second non-tape storage medium.

9. The method of claim 8, wherein the first non-tape storage medium and the second non-tape storage medium are the same.

10. The method of claim 9, wherein the first non-tape storage medium and the second non-tape storage medium comprise at least one disk drive.

11. The method of claim 1, further comprising:
presenting the at least one second directory and the respective second files to the user at a respective device.

12. The method of claim 1, comprising, prior to examining the selected data, backing up the selected data to the first storage medium from the client device.

13. The method of claim 1, wherein the indicator in each respective second file identifies the location of the corresponding first file, while the second file is stored in the second storage medium.

14. The method of claim 1, wherein the request is a request to retrieve file data.

15. The method of claim 1, wherein the request is a read request.

16. The method of claim 1, wherein the request is a write request.

17. A system to perform a data processing operation, comprising:
a first storage medium configured to store data;
a second storage medium configured to store data, wherein the second storage medium is remote from the client device; and
at least one processor configured to, prior to receiving a respective request to perform a data processing operation:
examine selected data stored in the first storage medium;
identify within the examined selected data one or more first directories containing one or more respective first data files containing stored data;
generate a respective second directory for at least one of the identified first directories;
for at least one of the first data files, generate a respective second file based at least in part on the corresponding first data file, wherein each second file comprises an indicator identifying a memory location of the corresponding first data file in the first storage medium, without the data in the respective corresponding first data file, wherein the first directories and the first data files are different types of files;
store the at least one second directory and the respective second files in the second storage medium;
the at least one processing device being further configured to, after storing the at least one second directory and the respective second files in the second storage medium:
receive from the user via the client device the respective request, wherein the respective request comprises a request to perform a data processing operation on a specified second file;
examine the indicator in the specified second file while the specified second file is located in the second storage medium to determine the memory location of the corresponding first data file in the first storage medium;
access the first data file located in the first storage medium via the indicator located in the second storage medium; and
perform the requested data processing operation on the first data file corresponding to the specified second file in response to the request to perform the data processing operation on the specified second file.

18. The system of claim 17, wherein the first storage medium comprises a tape library.

19. The system of claim 18, wherein the second storage medium comprises a virtual tape library (VTL).

20. The system of claim 18, comprising accessing the first file from the tape library.

21. The system of claim 17, wherein the first storage medium comprises a VTL.

22. The system of claim 21, comprising accessing the first file from the VTL.

23. The system of claim 21, wherein the second storage medium comprises a VTL.

24. The system of claim 17, wherein:
the first storage medium comprises a first non-tape storage medium; and
the second storage medium comprises a second non-tape storage medium.

25. The system of claim 24, wherein the first non-tape storage medium and the second non-tape storage medium are the same.

26. The system of claim 24, wherein the first non-tape storage medium and the second non-tape storage medium comprise at least one disk drive.

27. The system of claim 17, wherein the first storage medium and the second storage medium each comprise at least one disk drive.

28. The system of claim 17, wherein the processor is further configured to:
present the at least one second directory and the respective second files to the user at a respective device.

29. The system of claim 17, wherein the selected data comprises data backed up to the first storage medium from the client device.

30. A method for retrieving stored data for a user at a client device, comprising:
prior to receiving a respective request to retrieve stored data:
examining selected data stored on a first storage medium by a processing device, wherein the first storage medium comprises a tape library;
identifying within the examined selected data one or more first directories containing one or more respective first data files, by the processing device, the first data files containing stored data;

for at least one of the identified first directories, generating, by the processing device, a respective second directory;

for at least one of the first data files, generating by the processing device, a respective second file based at least in part on the corresponding first data file, wherein each second file comprises an indicator identifying a memory location of the corresponding first data file in the first storage medium, without the data in the respective corresponding first data file;

storing the at least one second directory and the respective second files in a second storage medium, wherein the first directories and the first data files are different types of files;

after storing the at least one second directory and the respective second file:

receiving from the user via the client device the respective request, the respective request comprising a request to retrieve stored data from a specified second file;

examining the indicator in the specified second file while the specified second file is located in the second storage medium to determine the memory location of the corresponding first data file in the first storage medium, in response to the respective request to retrieve stored data from the specified second file;

accessing the first data file located in the first storage medium via the indicator located in the specified second file in the second storage medium; and providing data from the first data file to the client device in response to the request to retrieve stored data from the specified second file.

31. The method of claim 30, wherein the second storage medium comprises a VTL.

32. The method of claim 30, further comprising:
presenting the at least one second directory and the respective second files to the user at a respective device.

33. The system of claim 32, wherein the second storage medium comprises a VTL.

34. The system of claim 32, wherein the processor is further configured to:
present the at least one second directory and the respective second files to the user at a respective device.

35. A system to retrieve stored data for a user at a client device, comprising:
a first storage medium configured to store data, wherein the first storage medium comprises a tape library;
a second storage medium configured to store data; and
at least one processor configured to, prior to receiving a respective request to retrieve stored data:
examine selected data stored in the first storage medium;
identify within the examined selected data one or more first directories containing one or more respective first data files containing stored data;
generate a respective second directory for at least one of the identified first directories;
for at least one of the first data files, generate a respective second file based at least in part on the corresponding first data file, wherein each second file comprises an indicator identifying a memory location of the corresponding first data file in the first storage medium, without the data in the respective corresponding first data file, wherein the first directories and the first data files are different types of files;
store the at least one second directory and the respective second files in the second storage medium;
the at least one processing device being further configured to, after storing the at least one second directory and the respective second files in the second storage medium:
receive from the user via the client device the respective request, the respective request comprising a request to retrieve stored data from a specified second file;
examine the indicator in the specified second file while the specified second file is located in the second storage medium to determine the memory location of the corresponding first file in the first storage medium, in response to the request to retrieve stored data from the specified second file;
access the first data file located in the first storage medium via the indicator located in the specified second file in the second storage medium; and
provide data from the first data file to the client device in response to the request to retrieve stored data from the specified second file.

* * * * *